United States Patent [19]
Kappus

[11] 3,792,587

[45] Feb. 19, 1974

[54] EXHAUST VECTORING MEANS

[75] Inventor: Peter Gottfried Kappus, Cincinnati, Ohio

[73] Assignee: General Electric Company, Lynn, Mass.

[22] Filed: July 17, 1972

[21] Appl. No.: 272,471

[52] U.S. Cl. .................... 60/229, 244/23 B, 244/52
[51] Int. Cl. .............................................. F02k 1/12
[58] Field of Search ............. 60/229, 228; 137/611; 244/23 B, 52, 12 B

[56] References Cited
UNITED STATES PATENTS

| | | | |
|---|---|---|---|
| 3,290,887 | 12/1966 | Poole | 60/229 |
| 3,112,616 | 12/1963 | Adamson | 60/229 |
| 3,344,882 | 11/1967 | Bellion | 60/229 X |
| 3,380,661 | 4/1968 | Markowski | 60/229 X |

FOREIGN PATENTS OR APPLICATIONS

| | | | |
|---|---|---|---|
| 1,210,939 | 11/1970 | Great Britain | 60/228 |

*Primary Examiner*—Clarence R. Gordon
*Attorney, Agent, or Firm*—Edward S. Roman

[57] ABSTRACT

An exhaust vectoring means is provided for use with an aircraft gas turbine engine in order to vector the exhaust stream from the engine in the generally vertical direction for vertical landing and takeoff. The exhaust vectoring means is installed forward of the engine variable exhaust nozzle and is compatible for use with afterburning engines. The vectoring means includes a series of articulated shells disposed in an opening through the underside of the engine housing. Thrust vectoring is accomplished by rotating the shells about fixed points of pivot. During the vertical mode of operation, a door covers the duct leading to the variable exhaust nozzle thereby directing the exhaust stream through the vectoring means. The door may be pivoted to seal the vectoring means during normal horizontal flight.

7 Claims, 3 Drawing Figures

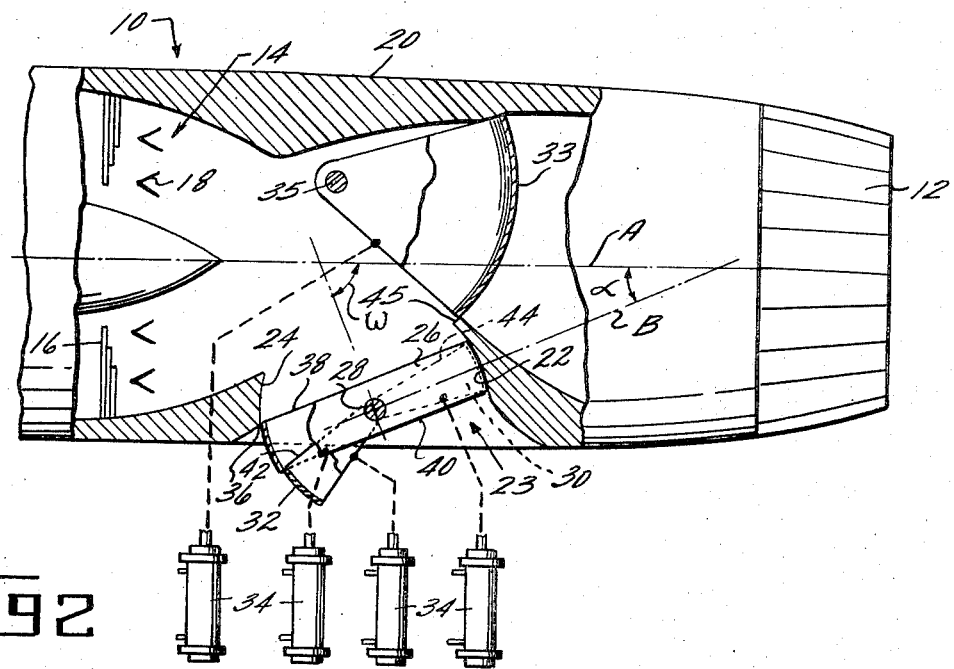
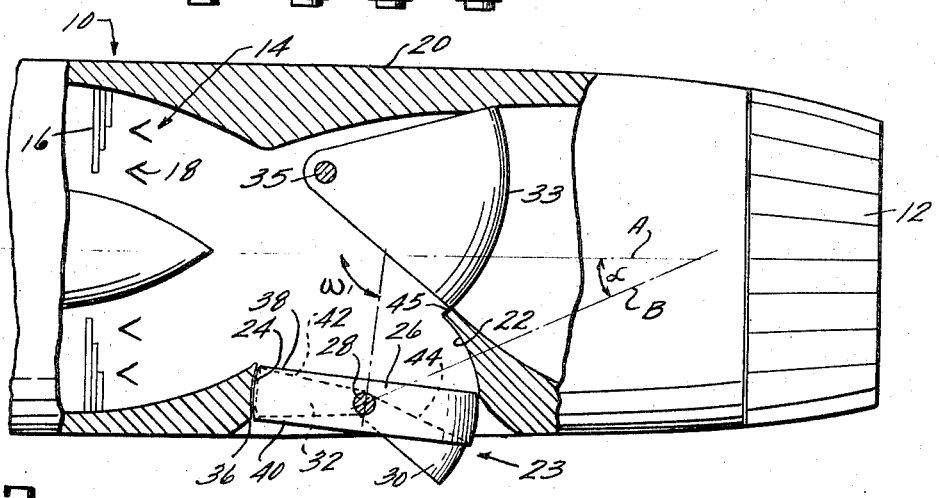
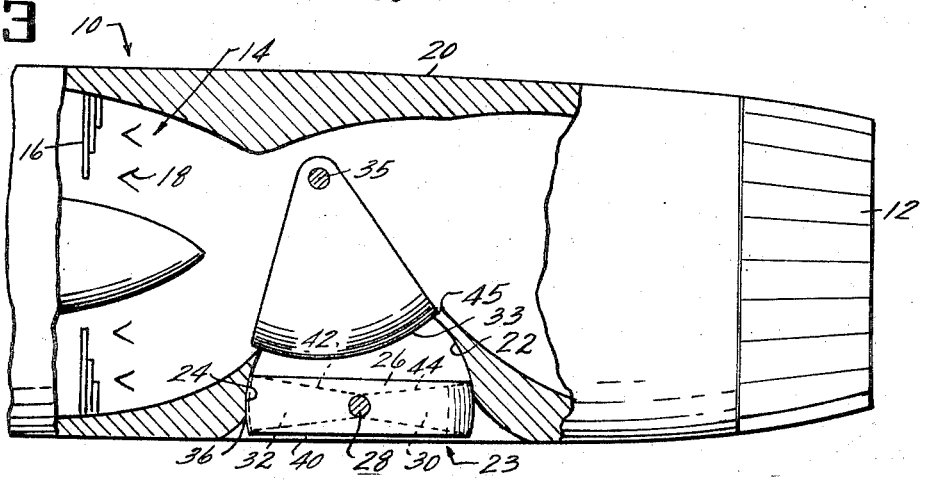

EXHAUST VECTORING MEANS

BACKGROUND OF THE INVENTION

In general, this invention relates to an exhaust vectoring means and, more particularly, to an exhaust vectoring means for vectoring the exhaust stream from an aircraft gas turbine engine to the generally vertical direction to facilitate vertical landing and takeoff.

It is generally known within the aircraft art to provide for deflection of the normally axial or horizontal flow from a gas turbine engine in a downward direction for purposes of vertical takeoff and landing. In vertical takeoff and landing aircraft, difficulties arise in varying the thrust angle to assist in smooth transition from vertical to horizontal flight and vice versa.

Movable exit cascades involving a plurality of parallel louvers are known to the art for vectoring thrust wherein such cascades are generally used beyond the engine exhaust nozzle for turning the flow. The disadvantage to louver cascades resides in their relatively delicate structure which generally makes them unsuitable for use with afterburning engines. The exhaust stream from an afterburning engine exits at an elevated temperature and velocity which would ultimately damage the conventional louver cascade unless the cascade can be cooled during the vertical flight mode of operation and retracted out of the exhaust stream during the normal horizontal flight mode of operation. However, the inclusion of complex means for cooling and retracting a louver cascade imposes a severe weight and performance penalty to the engine.

It is important, however, to be able to augment thrust during vertical takeoff and landing which are in fact the most critical stages of flight. Articulated exhaust vectoring systems of the type disclosed in U.S. Pat. No. 3,380,660 are known to the art, and may be suitable for use with afterburning engines. Such articulated exhaust vectoring systems generally require installation downstream of the engine variable exhaust nozzle. The engine variable exhaust nozzle, however, operates to increase the velocity and pressure of the exhaust stream therethrough and therefore the vectoring means becomes subjected to impingement from the exhaust stream at an increased velocity and pressure which may lead to premature damage of system components.

It is also desirable to be able to locate the vectoring means upstream of the variable exhaust nozzle in close proximity to the center of gravity of the aircraft in order to better balance the aircraft during the vertical mode of operation. Such balancing becomes particularly significant if the high augmented thrust levels available from an afterburner are to be utilized during vertical takeoff and landing.

Therefore it is a primary object of this invention to provide an exhaust vectoring means suitable for use with an afterburning gas turbine engine.

It is also an object of this invention to provide an exhaust vectoring means which may be installed upstream of the gas turbine variable exhaust nozzle close to the aircraft center of gravity in order to provide better balance during vertical takeoff and landing, and avoid impingement from the exhaust stream after it is accelerated by the variable exhaust nozzle.

SUMMARY OF THE INVENTION

Briefly stated, the above and other related objects are attained by the means of this invention for vectoring a gas stream from an engine. The vectoring means are disposed within a housing which contains the flow of gas therethrough from the engine. A truncated spherical opening is provided through the housing and a truncated spherical shell is concentrically disposed within the opening and rotatably connected to the opening at diametrically opposed points of pivot. At least two generally wedge shaped spherical shells are concentrically disposed within the truncated spherical shell and rotatably connected to the truncated spherical shell at the same diametrically opposed points of pivot. A blocker door is disposed within the housing for directing the gas stream through the opening for vectoring. The angle of the exhaust stream from the opening may be vectored by rotating the truncated spherical shell together with the wedge shaped spherical shells. Also, the effective exit area from the vectoring means may be varied by changing the relative positions of the wedge shaped spherical shells.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a side view partly in cross-section, with portions deleted, of the aft end of a gas turbine engine embodying the exhaust vectoring means of this invention.

FIG. 2 is a side view partly in cross-section, with portions deleted, showing the engine and exhaust vectoring means of FIG. 1 in a different mode of operation.

FIG. 3 is a side view partly in cross-section, with portions deleted, showing the engine and exhaust vectoring means of FIG. 1 in still another mode of operation.

DESCRIPTION OF THE PREFERRED EMBODIMENT

Referring now to FIG. 1, the aft end of a jet engine 10 is shown. Although the details of engine 10 are not shown, engine 10 is of conventional design in which ambient air is drawn into a compressor and delivered in compressed fashion to a burner section where heat is added. The air is then delivered to a turbine section where work is extracted and from where the air is discharged for further heating in an afterburner shown generally at 14. The engine may be of the non-afterburning type although it is preferred that the engine include an augmentor. Afterburner 14 is of the conventional type having a fuel injector 16 for dispersing fuel from a pressurized source (not shown) and a gutter 18 for stabilizing the afterburner flame. Although the present invention will be described in relation to an afterburning jet engine, it will be expressly understood that the present invention is not limited to such structure, but rather the present invention may be used with any jet engine, including bypass turbojets and mixed flow turbofans.

Engine housing 20 extends rearwardly from the afterburner 14 to a conventional variable area type nozzle 12. During operation of the engine in normal horizontal flight, the position of variable area exhaust nozzle 12 is controlled or regulated in accordance with engine parameters in a conventional manner.

FIG. 1 shows the engine in a vertical deflection mode of operation wherein the normally horizontal exhaust stream is deflected downward for vertical takeoff and landing. The exhaust vectoring means of this invention is shown generally at 23 as including a ventral opening 24 in the underside of the engine housing 20 for directing gas flow for vertical takeoff and landing. The ventral opening 24 is configured to the shape of a truncated sphere so as to accommodate inclusion of a truncated spherical shell 26 therein. The plane of the ventral opening 24 as represented in FIG. 1 by the edge line B is made to converge at an angle $\alpha$ on horizontal axis A of the engine 10 for reasons which will become apparent from the following discussion.

Truncated spherical shell 26 is of slightly smaller diameter than ventral opening 24 so as to permit unobstructed rotation of the shell 26 within the opening 24. The spherical shell 26 is retained for rotation relative to the opening 24 at pivots 28 which are diametrically opposed in alignment transverse to the engine axis A and orthogonal to the plane of the drawing. Disposed radially inward and concentric to the truncated spherical shell 26 are two generally wedge shaped spherical shells 30, 32. The wedge-shaped spherical shells 30, 32 are of substantially the same radius which is slightly smaller than the radius of the truncated spherical shell 26 so as to permit unobstructed rotation of the shells 30, 32 within the shell 26. Wedge-shaped spherical shells 30, 32 are also retained for rotation relative to the truncated spherical shell 26 and ventral opening 24 at the pivots 28. It is to be appreciated that each wedge-shaped spherical shell may be rotated about the pivot 28 independently of each other.

A generally wedge-shaped, spherical shell blocker door 33 of conventional design is rotatably maintained within the engine housing 20 at a point downstream of the afterburner 14 and upstream of the variable exhaust nozzle 12. The blocker door 33 is retained for rotation relative to the engine housing 20 at pivots 35 which are also in diametrically opposed alignment transverse to the engine axis A and orthogonal to the plane of the drawing. A plurality of actuators shown schematically at 34 are connected to each spherical shell so as to drive the individual shells about their respective pivots.

When deflection of the exhaust stream from the normal horizontal position to the downward position for vertical takeoff and landing is desired, blocker door 33 is first pivoted upward to the closed position shown in FIGS. 1 and 2. As becomes immediately obvious once the blocker door 33 is pivoted into the closed position, the exhaust stream is directed downward to provide a vertical thrust component for landing or takeoff. Transition from the horizontal thrust position to the vertical thrust position and vice versa must be accomplished in a gradual manner without sudden changes in thrust direction which might adversely affect aircraft stability.

FIGS. 1 and 2 show the extreme positions of exhaust stream divergence through the exhaust vectoring means 23 of this invention. Referring specifically to FIG. 1 it can be seen that the truncated spherical shell 26 has been rotated to the full counter-clockwise position. Rotation to the full counter-clockwise position is accomplished when the bottom circumferential edge 36 of the ventral opening 24 first meets the top circumferential edge 38 of the shell 26. Further counter-clockwise rotation of the shell 26 would operate to open a space between the bottom edge of the opening 24 and the top edge of the shell 26 permitting a portion of the exhaust stream to escape in a non-vectored direction.

It may also be seen from FIG. 1 that the wedge-shaped spherical shell 32 has been rotated to the full counter-clockwise position while the other wedge-shaped spherical shell 30 remains stowed inside the truncated spherical shell 26. Again full counter-clockwise rotation is completed when the bottom circumferential edge 40 of the shell 26 first meets the top semi-circular edge 42 of the shell 32. Further counter-clockwise rotation of the shell 32 would only operate to open a space between the bottom edge 40 of the shell 26 and the top edge 42 of the shell 32, again permitting a portion of the exhaust stream to escape in a non-vectored direction.

The extreme rearward direction for the vectored exhaust stream is shown intersecting the horizontal engine axis A at an angle $\omega$. The angle $\omega$ is dependent upon the dimensions of the spherical shells and ventral opening together with the angle $\alpha$ at which the plane of the ventral opening intersects the horizontal engine axis A. It can be readily seen that increasing the angle $\alpha$ operates to decrease the angle $\omega$ thereby allowing the extreme rearward direction of the vectored exhaust stream to more nearly approach the horizontal engine axis A.

Turning now to FIG. 2 there can be seen the exhaust vectoring means 23 actuated to vector the exhaust stream in the extreme forward direction as may be desirable for slowing the forward speed of the aircraft upon landing. It can be seen that the truncated spherical shell 26 has been rotated to the full clockwise position. Rotation to the full clockwise position is accomplished when the bottom circumferential edge 36 of the ventral opening 24 first meets the top circumferential edge 38 of the shell 26. Further clockwise rotation of the shell 26 only operates to open a space between the bottom edge of the opening 24 and the top edge of the shell 26 permitting a portion of the exhaust stream to escape in a non-vectored direction.

It may also be seen from FIG. 2 that the wedge-shaped spherical shell 30 has been rotated to the full clockwise position while the other wedge-shaped spherical shell 32 remains stowed inside the truncated spherical shell 26. Again full clockwise rotation is completed when the bottom circumferential edge 40 of the shell 26 first meets the top semi-circular edge 44 of the shell 30.

The extreme forward direction for the vectored exhaust stream is shown intersecting the horizontal engine axis A at an angle $\omega'$. The angle $\omega'$ is also dependent upon the dimensions of the spherical shells and ventral opening together with the angle $\alpha$ at which the plane of the ventral opening intersects the horizontal engine axis A. It can now be appreciated that increasing the angle $\alpha$ will also operate to increase the angle $\omega'$ thereby limiting the extreme forward direction of the vectored exhaust stream. Therefore, a compromise must be struck between the extreme angles of forward and rearward thrust to be made available. If the same vectored angles for extreme forward and extreme rearward thrust were found to be desirable then the plane B of the ventral opening 24 would be made parallel to the horizontal engine axis A.

It is to be appreciated that the actuators 34 are of the modulating type and may be controlled to hold any intermediate vectored angle between the extreme forward and rearward positions. It will also be appreciated that the effective nozzle area of the exhaust vectoring means 23 may be adjusted to accommodate various augmentation levels while in the vertical mode by varying the relative positions of the two wedge shaped spherical shells 30, 32.

Referring now to FIG. 3 there is shown the position for the exhaust vectoring means 23 and blocker door 33 during normal horizontal flight. The wedge-shaped spherical shells 30, 32 are in their stowed positions inside the truncated spherical shell 26 while the blocker door 30 has been opened by rotation over the ventral opening 24 blocking the flow of the exhaust stream therethrough. The spherical surface of the blocker door 30 closely engages the top circumferential edge 45 of the ventral opening 26 to prevent exhaust stream leakage during normal horizontal flight.

The above described exhaust vectoring means is primarily advantageous because it is suitable for use with afterburning turbojet and turbofan engines in comparison with conventional thrust vectoring mechanisms such as louver cascades which are generally not suited for use with afterburning engines. As previously discussed, high heat from the afterburner exhaust stream will generally operate to destroy the relatively delicate structure of a louver cascade making it unsuitable for afterburning engines. The substantially more rugged structure of the exhaust vectoring means of this invention may be made to readily resist the deteriorating effects of the afterburning exhaust stream.

Also, other articulated exhaust vectoring systems which may be suitable for use with afterburning engines require installation downstream of the variable exhaust nozzle. However, downstream installation subjects the thrust vectoring means to impingement from increased exhaust stream velocities and pressures which operate to cause a more rapid deterioration in the vectoring means. Downstream installation also places the resultant vertical lift vector far behind the engine center of gravity providing for a high turning moment with resultant aircraft instability during augmented operation. The exhaust vectoring means of this invention, however, may be located upstream of the variable area nozzle 12 providing for impingement of the exhaust stream before it is accelerated through the variable exhaust nozzle together with a reduced turning moment around the center of gravity of the aircraft.

Various changes could be made in the structure of FIGS. 1 through 3 without departing from the broader aspects of Applicant's invention. For instance, it will be appreciated that the exhaust stream cannot be vectored to any angle between the horizontal and vertical directions. The extreme rearward direction of vectored thrust is limited by the angle ω which cannot be made zero. Therefore, when switching thrust from the horizontal position to the vertical position, or vice versa, there remains an angular gap between which the thrust cannot be vectored. This angular gap, however, can be compensated by utilizing a variable exhaust nozzle 12 of a conventional type available for vectoring thrust a limited distance in the vertical direction. Such nozzles would not be satisfactory by themselves due to the limited angle through which the exhaust stream may be vectored. Therefore, having described a preferred embodiment of the invention, though not exhaustive of all possible equivalents, what is desired to be secured by letters patent is claimed below.

What is claimed:

1. A vectoring means for a gas stream from an engine comprises:

housing means for containing the gas stream;
   a truncated spherical opening through the housing;
   a truncated spherical shell concentrically disposed within the opening and rotatably connected to the opening at diametrically opposed points of pivot;

at least two generally wedge-shaped spherical shells concentrically disposed within the truncated spherical shell and rotatably connected to the truncated spherical shell at the same diametrically opposed points of pivot, and
   a blocker door disposed within the housing for directing the gas stream through the opening wherein the gas stream may be vectored by rotation of the truncated spherical shell together with the wedge-shaped spherical shells, and the effective exit area may be controlled independent of vector angle by varying the relative angular positions of the two wedge-shaped spherical shells.

2. The vectoring means of claim 1 for vectoring the exhaust stream from a gas turbine engine wherein:
   the housing means receives and directs the exhaust stream in a generally horizontal direction for forward thrust;
   and the opening extends through the underside of the housing for directing the exhaust stream in a generally vertical direction for vertical thrust.

3. The vectoring means of claim 2 wherein:
   the truncated spherical shell is of slightly smaller diameter than the opening and the diametrically opposed points of pivot are in substantial transverse alignment to the engine axis, and
   the wedge-shaped spherical shells are of substantially the same radius and of slightly smaller radius than the truncated spherical shell with the points of pivot for the wedge-shaped shells also aligned substantially transverse to the engine axis.

4. The vectoring means of claim 3 wherein the plane of the opening converges on the longitudinal engine axis so as to decrease the angle of the vectored exhaust stream from the longitudinal engine axis.

5. The vectoring means of claim 3 wherein the blocker door is a generally wedge-shaped spherical shell retained for rotation at points of pivot aligned substantially transverse to the engine axis such that rotation of the door to the closed position operates to divert the exhaust stream through the opening and rotation of the door to the open position operates to dispose the outside spherical surface of the blocker door in close engagement with the top circumferential edge of the opening permitting direction of the exhaust stream through the housing in a generally horizontal direction for forward propulsion.

6. The vectoring means of claim 2 disposed intermediate an afterburning stage and variable exhaust nozzle of the gas turbine engine.

7. The vectoring means of claim 2 including a plurality of actuators each of which is connected to rotate one of the spherical shells independent of the other shells and an actuator connected to rotate the blocker door independent of shell rotation.

* * * * *